United States Patent [19]
Hoeltzenbein

[11] 3,730,350
[45] May 1, 1973

[54] PLATE DIALYZER

[75] Inventor: Josef Hoeltzenbein, 44 Muenster/Westphalia, Germany

[73] Assignee: Baxter Laboratories, Inc., Morton Grove, Ill.

[22] Filed: July 12, 1971

[21] Appl. No.: 161,818

Related U.S. Application Data

[63] Continuation of Ser. No. 880,324, Nov. 26, 1969, abandoned.

[30] Foreign Application Priority Data

| July 26, 1969 | Germany | P 19 38 008.6 |
| Dec. 7, 1968 | Germany | 6,810,380 |
| Dec. 27, 1968 | Germany | 6,813,222 |
| Jan. 27, 1969 | Germany | 6,902,959 |

[52] U.S. Cl. ................................................210/321
[51] Int. Cl. ............................................B01d 31/00
[58] Field of Search ....................................210/321

[56] References Cited

UNITED STATES PATENTS 3,541,595   11/1970   Edwards ..............................210/321
3,547,271   12/1970   Edwards ..............................210/321

Primary Examiner—Frank A. Spear, Jr.
Attorney—W. Garrettson Ellis

[57] ABSTRACT

A plate dialyzer is provided with plates and membranes located therebetween. The membranes extend along the front sides of the plates and are bent around the ends of the plates. The ends of the membranes are tightly clamped between two adjacent plates. The plates have channels used for supplying or removing at least one of the dialysis liquids.

18 Claims, 7 Drawing Figures

Inventor:
J. Hoeltzenbein
By Richards & Geier
ATTORNEYS

PATENTED MAY 1 1973

Inventor:
J. Hoeltzenbein
By Richards & Geier
ATTORNEYS

Inventor:
J. Hoeltzenbein

PLATE DIALYZER

CROSS REFERENCE TO RELATED APPLICATION

This application is a continuation of Application Ser. No. 880,324, filed Nov. 26, 1969, now abandoned.

BACKGROUND OF THE INVENTION

This invention relates to a plate dialyzer with membranes located between the plates.

Dialyzers have an extensive field of use. They are used for separating solvent-containing liquids, particularly for separating colloids from molecularly dispersed smaller substances which are contained therein. When differently constructed, these plate dialyzers can also be used for exchange between liquids and gases, for example, as artificial lungs; for gas exchange, for example, as artificial gills; or as heat exchangers between two media capable of flowing, depending upon the selection of the membranes which separate the media taking part in the material exchange or heat exchange.

A special field of use for plate dialyzers is that of extracorporeal hemodialysis. In that case, the semipermeable membrane takes over the task of the physiological filter of the glomerulus capillaries. According to the laws of osmosis and diffusion, an exchange of material then takes place between, on the one hand, a blood film applied to one side of the membrane and, on the other hand, a scavenging solution flowing past the other side of the membrane. This use of a plate dialyzer as an artificial kidney is becoming more and more important at the present time, and for that reason, hereinafter special reference will be made to a blood dialyzer.

When artificial kidneys are used, it is necessary on the one hand to keep the blood filling volume as small as possible in order to avoid the use of additional aggregates, such as pumps, heating devices and the like and to avoid blood losses as much as possible, and, on the other hand, to arrange directions of flow within the dialyzer in such manner that there is the greatest possible laminar blood flow. Also, the distances for the blood to flow should be kept as short as possible to avoid damage to the blood.

It is particularly difficult to keep separate the dialysis liquids of a plate dialyzer. This is caused essentially by the fact that blood dialyzers use cellulose membranes which cannot be bonded with a water-resistant seal with the dialyzer plates either by gluing, soldering, or some other similar manner. In blood dialyzers of simpler construction, blood is introduced through a branched channel system into the grooves of dialyzer plates which are covered by the membranes. The scavenging solution flows in the grooves of an adjacent plate, so that a material exchange between the blood and the solution can take place only through the one contacting surface with the membrane, while a much larger surface of the blood is in contact with the inactive dialyzer plate. The efficiency of these dialyzers with respect to blood volume is very small, and furthermore, there is high resistance to the blood flow in the branched passages.

It is therefore desired for blood dialyzers that the blood should flow as a thin film between two membranes so as to provide substantially larger contacting surfaces for the material exchange. However, a great difficulty in such dialyzers consists in properly sealing the space for the blood between the membranes. This is particularly the case at locations through which blood enters between the membranes which are provided between two dialyzer plates. Consequently, in existing dialyzers special connecting and distributing pieces are used as tighteners in the space for the blood between two adjacent plates. For the purpose of the plates are provided with recesses into which the connecting and distributing pieces are tightly inserted. This arrangement has, above all, the drawback that these dialyzers are quite expensive; furthermore, due to the necessity of inserting individual connecting and distributing pieces, their assembly requires lengthy operations.

An object of the present invention is to eliminate drawbacks of prior art constructions through the provision of a plate dialyzer of greatly simplified construction which provides complete sealing and separation of the dialysis liquids.

Another object is the provision of such a dialyzer which is of small size with a low blood volume capacity while having large area membrane surfaces available for the material exchange.

Yet another object is the provision of such a dialyzer which is inexpensive to manufacture and easy to operate, so that it can be given into the hands of a patient and can be discarded after a single use.

Other objects of the present invention will become apparent in the course of the following specification.

DESCRIPTION OF THE INVENTION

In the accomplishment of the objectives of the present invention, it was found desirable to provide a plate dialyzer wherein the membranes extend along the front sides of a stack of plates. Channels open toward the stack of plates and membranes for the inflow and outflow of at least one of the dialysis liquids. The membranes are folded over the ends of the plates, and the ends of the membranes are tightly clamped between two adjacent plates.

Basically, in the case of the plate dialyzer of the present invention, it does not make any difference whether it is a co-current dialyzer, a counter-current dialyzer, or a transverse current dialyzer. In all of these plate dialyzers the plates have profiled front sides providing a system for conducting liquids, and flat, rear sides, the front sides being covered by membranes. Profiled plates can be replaced by flat plates if their material has a fluid transmitting structure, such as foam-like or felt-like materials.

According to a preferred embodiment of the present invention, the front sides of all plates which are adjacent to the channels are enclosed by the membranes, so that there is no connecting joint between the plates and the membranes. This is attained by affixing together in advance a separate plate and a separate membrane one over the other in such manner that the profiled front sides are covered by the membranes on the one hand and, on the other hand, the rear sides of the plates are covered at the edges by ends of membranes. The stacked plates lie directly one upon the other in alternating face-to-face and back-to-back relationship as shown in FIGS. 1 and 7.

To facilitate the penetration of the dialysis liquids into formed channels between the stacked dialyzer plates, it is particularly advantageous to provide the plates at their profiled front sides with edges inclined toward the channels between the stacked plates so that connecting chambers or recesses are formed extending wedgewise toward the channels for the inflow or outflow of a dialysis liquid.

It is further of advantage to shape the profile of the front sides of the plates as parallel grooves for guiding the flow of dialysis liquid between two adjacent membranes and also for guiding the dialysis liquid flowing between the membranes and the plates, the grooves extending from an advance connecting chamber to a connecting chamber located at the opposite end of the plate. The grooves can be straight or curved. They can also intersect each other diagonally or at right angles to each other. In the latter case there are no continuous ribs upon the plates between the grooves, but individual upstanding humps. If the covering arrangement of adjacent groove sections of the plates is the same, capillary passages are formed of practically flat-oval cross-section.

If a wide flowing blood film is to be produced between two plates, it is advantageous to shift relatively to each other the grooves of the superposed front sides of the plates and to support the plates relatively to each other upon sealing edge shoulders.

The wide, uninterrupted blood film which is produced by this construction, or the corresponding dialysis liquid, if the dialyzer of the present invention is not being used for blood dialysis, is guided upon its upper side as well as upon its lower side between membrane surfaces available for the substance exchange. This greatly increases the efficiency of the dialyzer. The other dialysis liquid—in case of blood dialysis, a scavenging solution—is introduced into transverse channels provided in the front sides of the plates parallel to the connecting chambers at the edge of the ends of the plates. These transverse channels are also connected with the grooves and enter sidewise into perpendicular channels. Preferably, the transverse channels change from the front side of the plates to the rear side of the plates directly before the sealing shoulders, and the perpendicular channels extend through the sealing shoulders and the membranes.

The clamped membrane ends are preferably guided inwardly up to and over the perpendicular channels to make them tight upon the rear surfaces of the plates.

The described plate dialyzer of the present invention operates preferably on the principle of co-current or counter-current. It has the advantage that it is composed of only a few individual parts. If it is desired that the dialyzer be operated according to the cross-current principle, it is merely necessary to locate the transverse channels upon the wide sides of the plates and to provide intersecting grooves to connect the transverse channels and connecting chambers on the plates with the grooves. Typically, the stack consisting of plates and membranes is covered on the top and bottom by cover plates and is covered on the front sides with connecting plates, the cover plates and the connecting plates being firmly connected with each other. Preferably, the perpendicular side channels end in aligned connecting sleeves of the cover plates.

A further advantage of the plate dialyzer of the present invention results from the provision of a hardening grouting mass on the longitudinal sides of the plates, which produces a firm connection between the plates, the membranes, the cover plates, and the connecting plates.

It is of advantage to make the longitudinal sides of the plates inclined, so that the membranes extend a little outwardly, beyond the tightening shoulders on the longitudinal sides of the stack.

The invention will appear more clearly from the following detailed description when taken in connection with the accompanying drawings, showing, by way of example only, a preferred embodiment of the inventive idea. The illustrated embodiment is that of the dialyzer for the blood wash, which can be operated on the co-current principle as well as on the counter-current principle.

Figure 1:
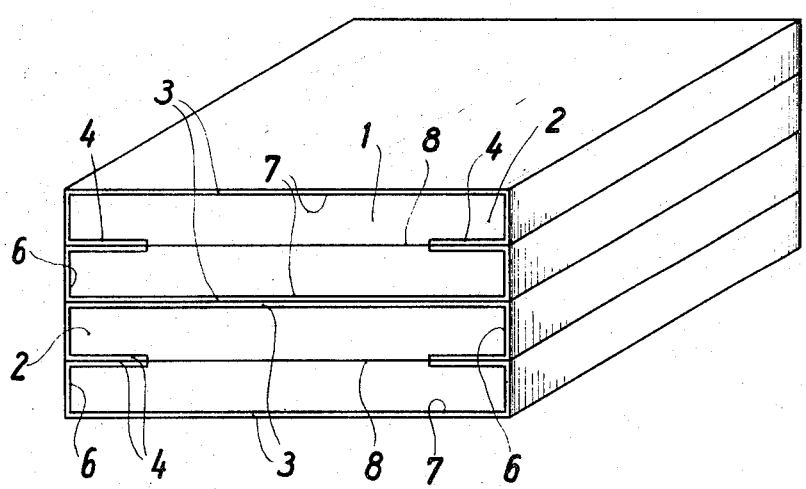
FIG. 1 is a perspective view of a plate-membrane stack.

FIG. 1 shows four plates 1 located one over the other with their corresponding membranes 3 which are used to build up a plate-membrane stack of the plate dialyzer of the present invention. The plates 1 consist of a synthetic material, while the membranes 3 are made in the usual manner of cellulose foil. The plates 1 have a profiled front side 7 constituting conduits for the guiding of dialysis liquids. The rear surface 8 of the plates 1 is flat. The membranes 3 have the same width as the plates 1 and cover their entire upper surface 7. However, the membranes are longer than the plates 1 and extend frontwise around the plate ends 2, so that they also lie upon the edge portions of the rear surfaces 8 of the plates 1.

Each plate 1, along with one membrane 3, is combined into one unit, and several such units are combined to form a plate-membrane stack. The plates 1 are then so placed one on top of the other that their front sides 7 and their rear sides 8 are always directly one on top of the other; that is, each plate is face-to-face and back-to-back relation respectively with adjacent plates. Thus the membranes 3 covering the front sides 7 of the plates are in direct engagement with a neighboring membrane, and the ends 4 of the membranes which extend around the plate ends 2 also lie next to neighboring membrane ends, and are clamped between the rear sides 8 of the plates. To simplify the mounting, the membranes 3 can be glued to the plates 1.

It should be noted that in order to facilitate disclosure, the drawing does not show the correct size relationship between the membranes and the plates. Actually, the relation of the membrane thickness to plate thickness is about 1:100, so that it is not absolutely necessary to place the ends 4 of the membranes into special recesses of the plate rear sides 8. It is of importance, however, that the membrane ends 4 should be firmly clamped between the rear sides 8. This is facilitated by the swelling of the membranes 3 when they are wetted.

Figure 2:
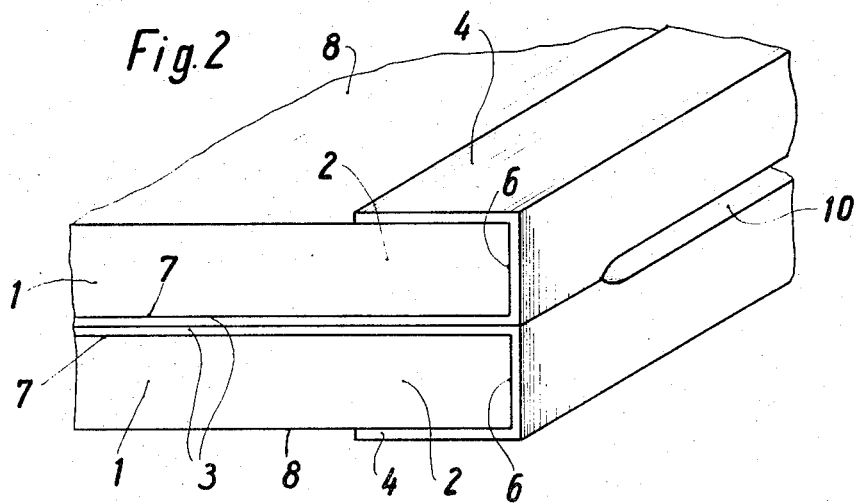
FIG. 2 is an enlarged perspective view of a portion of the plate-membrane stack.

Blood is always guided between two membranes 3. The pressure of the blood causes the membranes to bend into the profiles of the front sides of the plates. This bending can be facilitated by negative pressure of the scavenging solution flowing directly through the profiles on the opposite sides of membranes 3 from the blood. As shown in FIG. 2, blood is directed through the preliminary or connecting chambers 10 to flow between the membranes 3 along the plate side edge surfaces 6.

Figure 3:
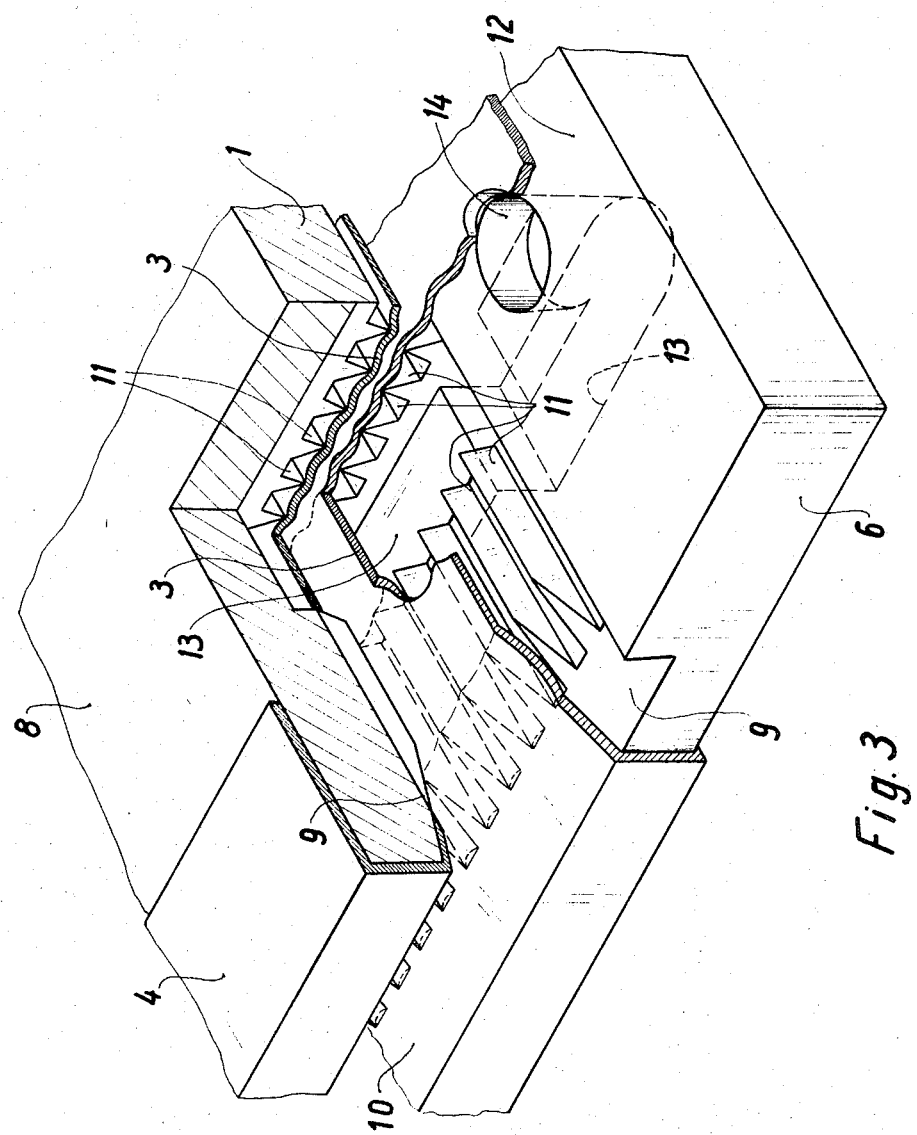
FIG. 3 is an enlarged perspective view, partly broken off and in section, of a portion of the plate-membrane stack.

FIG. 3 shows the inner structure of the plate-membrane stack. It shows that the preliminary chamber 10 is formed by an inclined edge 9 between the side surfaces 6 and the front sides 7 of the plates 1. The inclined edge 9 has the same width as the profile formed by grooves 11 in the front sides 7 of the plates. The grooves 11 are preferably trapezoidal in cross section and extend parallel to each other. They extend toward the chambers 10 on both edges of the plate 1, but are not directly connected with it after the dialyzer is assembled, since the chamber 10 is separated from the grooves 11 by membranes 3. A sealing shoulder 12 is provided on both sides of plates 1 parallel to the grooves 11; it provides a tight separation of the liquid flow passages from the longitudinal sides of the dialyzer.

Furthermore, two directly adjacent plates 1 support each other through the shoulders 12, particularly when the grooves 11 of adjacent plates are shifted relatively to each other. Then the projections of two superposed plates located between the grooves are not situated opposite each other. This has the advantage that the direction of flow between the membranes 3 is not divided into a large number of individual channels, but makes possible the provision of a wide blood film wave-like in cross-section. This has an advantageous effect upon the laminar blood flow.

A transverse channel 13 is provided upon both ends of each plate 1 shortly in front of the ending of the grooves 11 at the chambers 10. The channel 13 is used for conducting the scavenging solution, which is guided directly in the grooves 11. Thus the channel is connected with all the grooves. At each side of the plate, transverse channels 13 change from the front side of the plate to its rear side directly before the shoulders 12 and open there into perpendicular channels 14. The membranes 3 pass inwardly upon the rear sides 8 of the plates to extend over the channels 14. As a result of this tight arrangement, no liquid from the channels 14 can penetrate between the rear surfaces 8 of the plates. Since all plates 1 are located in alignment one over the other, the perpendicular channels 14 provide vertical passages located at each corner of the plate-membrane stack, and extending perpendicularly therethrough. To avoid interruption of these channels, before or after assembly the membranes can be perforated by a suitable tool.

In the illustrated embodiment of the present invention, the grooves 11 of the plate dialyzer have a double function. In the first place, they directly conduct the scavenging solution through the grooves covered by the membranes. At the same time, however, they also provide a flow passage for the blood between the membranes 3, since the membranes bend themselves into the grooves 11 under the pressure of the blood, to define blood flow channels. Thus in accordance with this embodiment of the invention, blood and the scavenging solution are guided parallel to each other, and this can be be carried out in a co-current or counter-current manner.

The tight seal between the groove spaces and the intermediate spaces of the membranes is attained substantially by pressing the membrane ends 4 upon the rear surfaces 8 of the plates. The scavenging solution cannot penetrate into the blood passages of the dialyzer due to the complete covering of the inclined edges 9 and the front surfaces 6 of the plates by the membranes. On the other hand, it is not possible for the blood to be pressed into the joint between the ends 4 of the membranes because of sealing shoulders 12.

Figure 4:
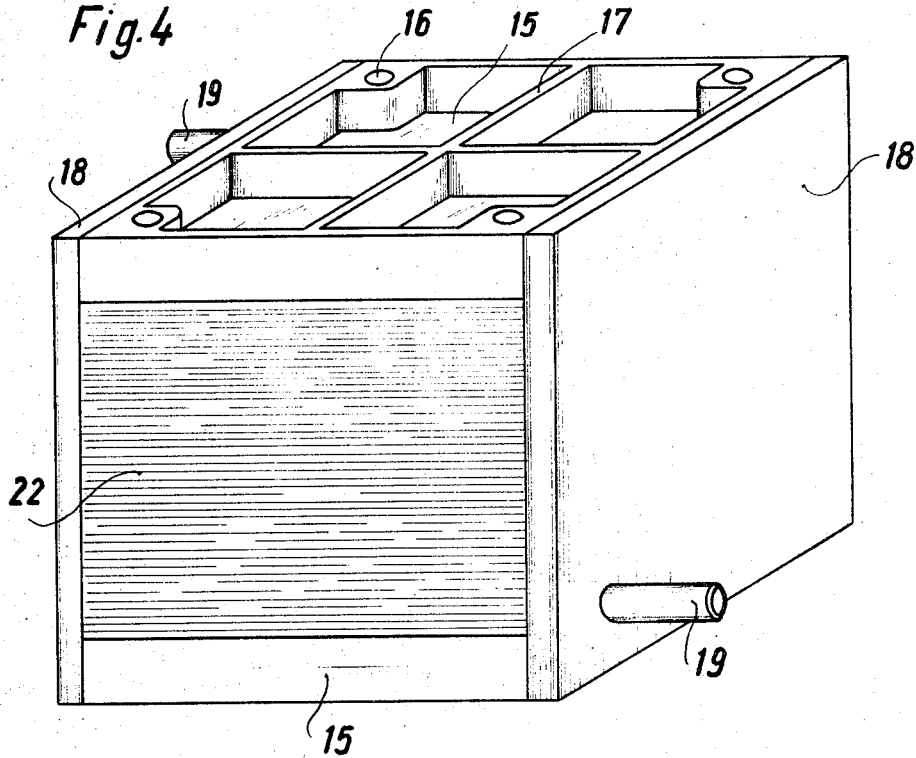
FIG. 4 is a perspective view of a plate dialyzer of the present invention.

FIG. 4 shows a dialyzer provided with the above described plate-membrane stack. The plate-membrane stack is covered on top and bottom with cover plates 15, while its two front sides are covered by connecting plates 18. The corners of the cover plates 15 are provided with connecting sleeves 16 extending in alignment with the vertical passages or channels 14 in the stack. Usually, only one sleeve 16 is used on the upper side and one sleeve 16 on the underside of the stack, so that the other connecting sleeves in the cover plates 15 are closed. This can be effected by plugs fitting tightly into the sleeves 16. In order to provide a fully extending vertical channel, after assembly the membranes 3 must be pierced unless they were initially made with corresponding holes. As has been stated already, this can be effected by any suitable tool. Preferably, the two sleeves 16 on the upper and lower side of the dialyzer which will be operated are those extending diagonally to each other in order that all flows of scavenging solutions entering or leaving through the sleeves 16 and passing through the dialyzer be of equal length. It is possible to operated two pairs of sleeves 16, each pair being located on diagonally opposed corners of the stack when the washing solution flow is to be increased, in order to provide a more uniform pressure distribution in the system of the scavenging solution, particularly when the wash liquid is sucked with negative pressure through the dialyzer.

The cover plates 15 are also provided with ribs 17 used for strengthening purposes.

Figure 5:
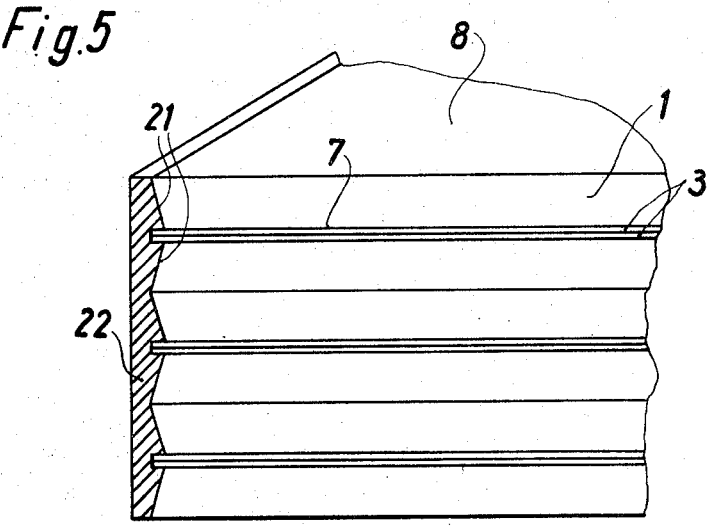
FIG. 5 is a partial vertical section through a longitudinal side wall and adjacent plates and membranes of the dialyzer.

The longitudinal sides of the plate dialyzer of the present invention are covered with a cast mass 22. The plates 1 have longitudinal sides 21 (FIG. 5) which are somewhat inclined, so that they recede from the membranes 3, while the ends of the membranes project somewhat outwardly upon the longitudinal sides of the dialyzer. Thus the cast mass 22 will enclose these projecting ends of the membranes, as best shown in FIG. 5. Consequently, the cast mass 27 assures a firm connection of all component parts of the dialyzer, in that it interconnects and holds together the plates 1, the membranes 3, the cover plates 15, and the connecting wall plates 18. Furthermore, the cover plates 15 and the connecting walls 18 can be firmly connected with each other by soldering or gluing.

Figure 6:
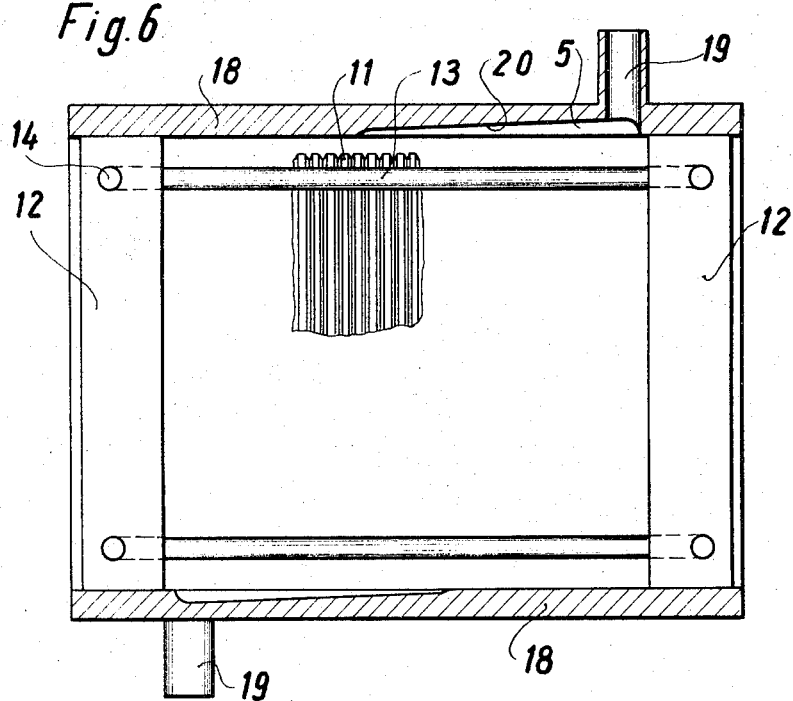
FIG. 6 is a horizontal section through the dialyzer.

FIG. 6 shows the manner in which the channels 5 located in the front and rear of the stack are formed by recesses 20 in the connecting walls 18. The connecting sleeves 19 extend into the channels 5. The channels 5 can have a cross-section diminishing in the direction away from the sleeve 19, to provide the greatest possible uniformity of the current. Actually, a recess 20 in the shape of a half circle in cross-section which extends from the sleeve 19 in vertical direction would interconnect all the chambers or recesses 10 of the stack and would be sufficient. The two sleeves 19 on the plates 18 are also located diagonally to each other, in order to provide the same length for all currents of blood passing from one sleeve 19 to the other and also, in case the dialyzer is not used as an artificial kidney, for the corresponding dialysis liquid. It should also be noted that the grooves 11 are not shown in their correct size in FIG. 6, but are enlarged to provide a clearer illustration.

Figure 7:
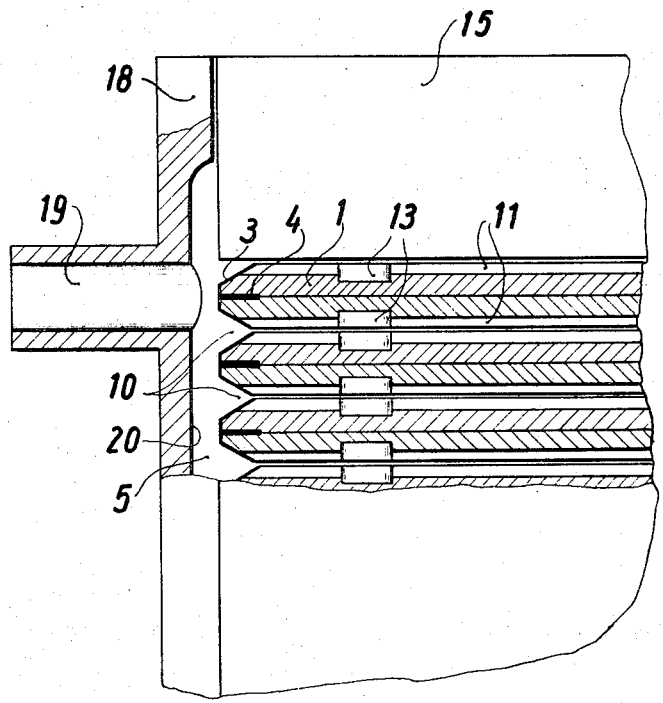
FIG. 7 is a partial vertical section through the dialyzer.

As shown in the sectional view of FIG. 7, the connecting channels or recesses 10 open wedge-like toward the channels 5. This provides an easy, undisturbed flow of blood between the membranes 3. The channels 5 and the recesses 10 have such small cross-sections that they have no important influence upon the blood fill volume of the dialyzer. In actual practice the transverse channels 13 will be located as closely as possible to the edges of the plates 1 in order to rinse the membranes 3 with the wash liquid along the longest possible path.

The construction of the plate dialyzer of the present invention is extremely simple. It consists substantially of three basic elements, namely, the plate-membrane units, the cover plates, and the connecting plates. The putting together of these parts is very simple, particularly since the new arrangement of the membranes makes possible an effective tight seal of the paths of the dialysis liquid with very simple auxiliary means. Thus, the present invention makes possible a very cheap mass manufacture of these plate dialyzers, so that this instrument can be given at the same time into the hands of many patients, particularly when it is used as an artificial kidney.

That which is claimed is:

1. A dialyzer, comprising a plurality of superposed units, each unit having a plate and a membrane, said plate having a front side, a rear side, and two opposed side edge surfaces between the two sides, said membrane extending over said front side and said side edge surfaces and having ends extending over a portion of said rear surface, and connecting walls covering two sides of said superposed units, each of said walls having a channel facing the membranes and extending over said side edge surfaces for the inflow or outflow of at least one dialysis liquid, said ends of the membranes being firmly clamped between two adjacent plates.

2. A dialyzer in accordance with claim 1, wherein said front side of the plate is profiled to form a liquid-conducting groove system covered by the membrane, said rear side of the plate being flat.

3. A dialyzer in accordance with claim 2, wherein in said superposed units the front side of each plate is located directly next to the front side of an adjacent plate and the rear side of each plate is located directly next to the rear side of an adjacent plate.

4. In a diffusion device such as a dialyzer, a plurality of stacked plates, the front side of each plate being covered by a membrane folded at opposed ends about the edges of said plate so that opposed membrane ends lie adjacent the rear side of said plate, said plates being arranged in face-to-face and back-to-back relation respectively with adjacent plates to clamp said membrane ends between the rear sides of adjacent plates.

5. A diffusion device such as a dialyzer comprising a plurality of stacked plates, each plate having a front side with sealing shoulders on opposed side edges and a profiled surface defined on said plate between the shoulders for defining fluid flow channels across said plate, the front side of each plate being covered by a membrane folded at opposed ends about the edges of said plate between the sealing shoulders, so that opposed membrane ends lie adjacent the rear side of said plate, the plates being arranged in face-to-face and back-to-back relation respectively with adjacent plates to clamp said membrane ends between the rear sides of adjacent plates, first manifold means for conducting a fluid across said plates through said fluid flow channels between the plate and its associated membrane, and second manifold means for conducting fluid across said plates between the membranes of plates lying in face-to-face relation.

6. The diffusion device of claim 5 in which the front sides of the plates have grooves extending transversely to the direction of flow of said fluid flow channels and communicating therewith, said transverse grooves also communicating with entry ports passing through said sealing shoulders.

7. The diffusion device of claim 6 in which central portions of said transverse grooves are open to the front side of each plate, and end portions of said grooves are open to the rear side of each plate within said sealing shoulders and sealed from said front side.

8. The diffusion device of claim 7 in which vertical passages extend through said sealing shoulders and said membranes, said passages communicating with the transverse grooves.

9. A diffusion device in accordance with claim 8 comprising a rigid container for said stack of plates, including cover plates located on the top and bottom of said stacked units.

10. A diffusion device in accordance with claim 9 comprising sleeves carried by said cover plates and aligned with said vertical passages.

11. The diffusion device of claim 10 in which some walls of said container comprise a cast-hardened mass firmly interconnecting said cover plates and stacked plates.

12. The diffusion device of claim 11 in which the lateral edges of the sealing shoulders are inclined to permit edges of the membrane to extend outwardly beyond the sealing shoulder lateral edges.

13. The diffusion device of claim 6 which is a dialyzer for blood.

14. The diffusion device of claim 6 in which the front sides of said plates have inclined edges defined between said sealing shoulders, to form wedge-like connecting channels to serve as manifolds for receiving and collecting fluid.

15. The diffusion device of claim 14 in which said second manifold means for conducting fluid across said plates through spaces between the membranes comprises sleeves for conducting fluid to and from said diffusion device, and distribution channels communicating between said sleeves and spaces between said membranes by way of the wedge-like connecting channels, each distribution channel diminishing in depth as it leads away from its associated sleeve, to provide a uniform flow of fluid between the membranes of said plates.

16. The diffusion device of claim 6 in which said profiled surface comprises parallel grooves extending between opposite edges of each plate between the sealing shoulders.

17. The diffusion device of claim 16 in which the grooves are uniformly spaced, but asymmetrically arranged with respect to said plate, whereby the grooves of two said plates in face-to-face arrangement are laterally shifted with respect to each other.

18. A diffusion device such as a dialyzer comprising a plurality of stacked plates, each plate having a front side with sealing shoulders on opposed side edges, and a profiled surface defined on said plate between the shoulders for defining fluid flow channels across said plate, the front side of each plate being covered by a membrane folded at opposed ends about the edges of said plate between the sealing shoulders, so that opposed membrane ends lie adjacent the rear side of said plate, the plates being arranged in face-to-face and back-to-back relation respectively with adjacent plates to clamp said membrane ends between the rear sides of adjacent plates, first manifold means for conducting a fluid across said plates through said fluid flow channels between the plate and its associated membrane, and second manifold means for conducting fluid across said plates between the membranes of plates lying in face-to-face relation, said plates defining grooves extending transversely to the direction of flow of said fluid flow channels and communicating therewith, the central portion of said transverse grooves being open to the front side of each plate, and end portions of said transverse grooves being open to the rear side of each plate within said sealing shoulders and sealed from said front side and communicating with fluid entry ports, the front sides of said plates also having inclined edges defined between said sealing shoulders to form wedge-like connecting channels to serve as manifolds for receiving and collecting fluid.

* * * * *